No. 751,259. PATENTED FEB. 2, 1904.
C. E. CHAFFEY.
HOSE COUPLING.
APPLICATION FILED AUG. 27, 1903.
NO MODEL.
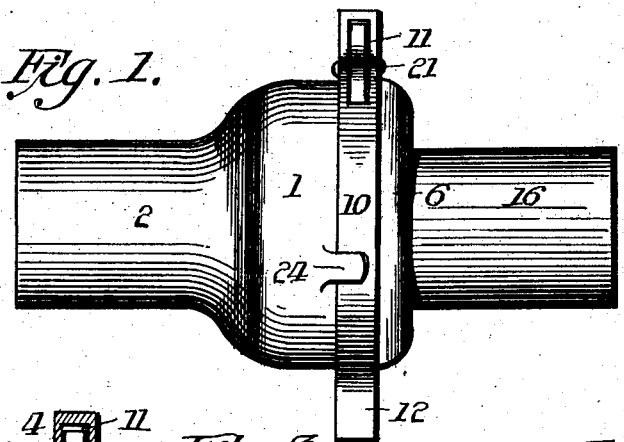
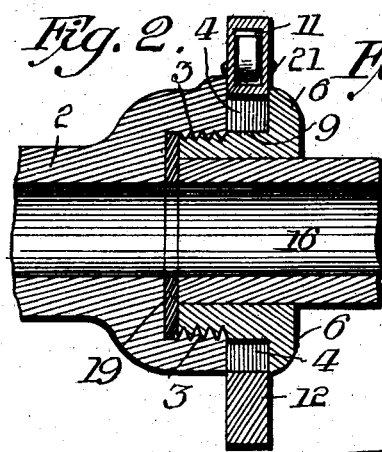
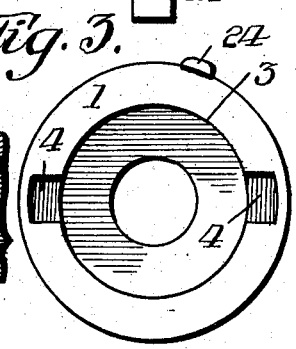
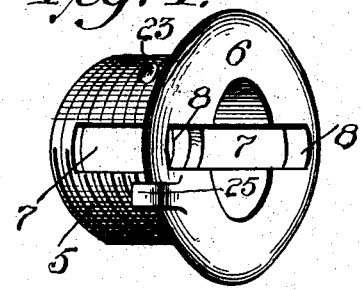
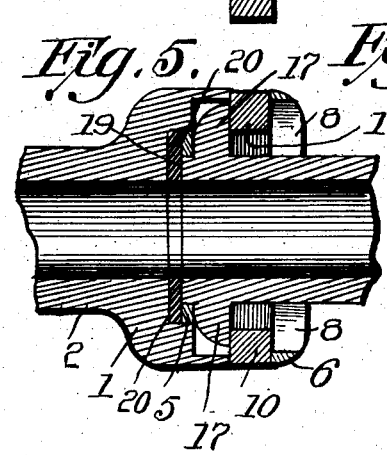
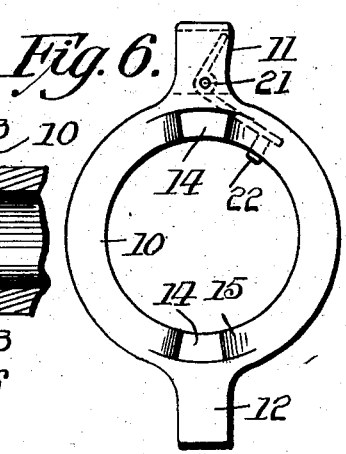
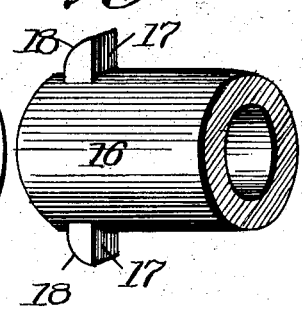
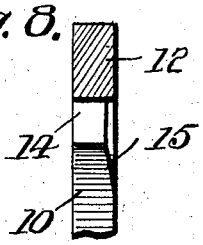
Witnesses:
Inventor
C. E. Chaffey.
By
Attorneys No. 751,259. Patented February 2, 1904.

UNITED STATES PATENT OFFICE.

CHARLIE E. CHAFFEY, OF PITTSBURG, PENNSYLVANIA.

HOSE-COUPLING.

SPECIFICATION forming part of Letters Patent No. 751,259, dated February 2, 1904.

Application filed August 27, 1903. Serial No. 170,993. (No model.)

*To all whom it may concern:*

Be it known that I, CHARLIE E. CHAFFEY, a citizen of the United States of America, residing at Pittsburg, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplings; and the object of the invention is to provide means for effectually and quickly joining two sections of hose together without requiring the necessity of threading the coupling members into coupled engagement, as is now the general practice.

In describing the invention in detail reference is had to the accompanying drawings, forming a part of this specification, and wherein like numerals of reference indicate like parts throughout the several views, in which—

Figure 1 is a side elevation of my improved coupling, showing the members in the coupled position, but not locked. Fig. 2 is a vertical longitudinal sectional view of the members, partly broken away, showing the same in the locked position. Fig. 3 is an end view of the female member. Fig. 4 is a detached detail perspective view of the threaded sleeve which receives the male member. Fig. 5 is a horizontal sectional view, partly broken away, showing the members in the locked position. Fig. 6 is a detached detail plan view of the locking-ring. Fig. 7 is a detached detail perspective view of the male member. Fig. 8 is a vertical sectional view of a part of the locking-ring.

In the present illustration of my invention I have not shown the means for attaching the hose onto the coupling members, as this may be effected in any desired or approved manner and forms no part of the present invention.

As heretofore stated, the invention comprises a female member and a male member, together with details of construction which permit of these members being easily and quickly coupled or uncoupled. The female member comprises a body 1, having an integral extension 2, to which the hose (not shown) is adapted to be secured in any approved manner. The body 1 of the female member is provided in its engaging face with a circular recess, the walls of which are provided with threads 3, and in which walls at opposite sides of the recess are notches or cut-away portions 4. Threaded into engagement with the threads 3 is a sleeve 5, provided at its outer end with an annular flange 6 and which sleeve is provided at opposite sides with slots 7, extending into the flange 6 and terminating in notches 8 in said flange. These notches 8 are adapted to aline with notches 4 in the body 1 and are for the purpose of permitting the entrance of locking-lugs carried by the male section in the slots 7 and being received in notches or cut-away portions 4, provided therefor in the body 1. The threaded sleeve 5 is left unthreaded on its periphery adjacent to the inner face of the flange 6, and on this unthreaded portion 9 is mounted a locking-ring 10, provided at opposite sides of its periphery with lugs 11 12, respectively, and the opposite sides of its inner circumference with cut-away portions 14, extending through locking-ring. One of the side faces of the locking-ring is beveled off to form the cam-surface 15 adjacent to the cut-away portions or openings 14 at each side thereof, which cam-surfaces are provided for the purpose of preventing the walls at the ends of openings 14 engaging with the lugs carried by the male member and also serving to insure the locking-ring being turned, so as to engage with the side lugs and frictionally contact therewith. The male member 16 is substantially tubular in form and adjacent to its inner end is provided at opposite sides of its periphery with lugs 17, the inner faces of which are preferably beveled off, as shown at 18, in order to permit a more ready entry of said lugs into notches or cut-out portions 8 and free entry into notches or cut-out portions 4. The male member is preferably seated with its inner end against the flexible gasket 19, which is seated in the annular seat 20, provided therefor in the body 1. I provide means for holding the locking-ring in the locked position, and a practical form of this means has been shown in the present illustration, which consists in recessing the lug or extension 11, so as to pivot therein the locking-pawl 21, carrying the pin 22, projecting through the locking-ring in the opening thereof, whereby to engage in the opening or recess 23, provided therefor in the threaded sleeve 5. The locking-ring is limited in its rotary movement by the stop-lug 24, carried by the body 1, and when the lug or extension 11 engages with this stop-lug 24 pin 22 will then be in position to engage in opening 23 and secure the members in the locked position.

To release the same, pawl 11 is pressed, so as to raise pin 22, and the locking-ring may then be turned so that extension or lug 11 will aline with notches 4 8 and slot 7, and in order to properly aline the locking-ring in this position I provide the flange 6 of sleeve 5 with a stop-lug 25, which is engaged by the lug or extension when the locking-ring is moved to position, as seen in Fig. 1 of the drawings.

To assemble the parts, the locking-ring is placed in its position on the threaded sleeve 5 against the inner face of flange 6, and this threaded sleeve 5 is then placed in threaded engagement with the body 1, as seen in Fig. 2 of the drawings, the slots 7 and notches or cut-away portions 8 registering or alining with the notches or cut-away portion 4 in the body 1. These three members—namely, the body 1, the locking-ring, and the sleeve—it will therefore be observed, remain coupled together when the male member has been uncoupled or detached therefrom. Now to couple the male member and the female member together the said male member is inserted in the opening through flange 6 into the sleeve 5, the lugs 17 passing in the oppositely-disposed notches or cut-away portions 8 and through slots 7 into seated engagement with the oppositely-disposed notches or cut-away portions 4 4, which hold the male member against rotation. The lugs 17 were permitted to pass beyond the locking-ring by reason of the latter being positioned so that notches or cut-away portions 14 would not aline with slot 7. When the male member has been positioned as above described, the locking-ring 10 is given a partial rotation, the cam-faces 15 guiding the face of the ring into engagement with the outer face of the lug 17, and as soon as the ring has been turned sufficiently far to bring pin 22 into registry with opening 23 the said pin drops into this opening and locks the ring against further rotation until the pin is disengaged. To prevent the ring being turned past the point where the pin 22 will lock with opening 23, I provide the stop-lug 24. When pin 22 is disengaged from opening 23, the locking-ring may be turned back, and when extension 11 engages stop-lug 25 the notches 14 will be in registry with notches or cut-away portions 4, slots 7, and notches or cut-away portions 8, whereby the male section may be disconnected or uncoupled from the female section.

Having fully described my invention, what I claim as new, and desire to secure by Letters Patent, is—

1. In a hose-coupling, a female member comprising a recessed body portion interiorly threaded and provided with oppositely-disposed notches or cut-away portions, a sleeve threaded into said recess having a flange at its outer end and provided with oppositely-disposed slots terminating in notches or cut-away portions in said flange, a locking-ring mounted on said sleeve and provided in the wall of its inner circumference with notches, and a male member adapted to enter said sleeve and provided with lugs adapted to seat in the notches of the female member and be engaged by said locking-ring, substantially as described.

2. In a hose-coupling, a female member comprising a recessed body portion provided in the walls of said recess with oppositely-disposed notches, a sleeve fitted in said recessed body and provided with oppositely-disposed slots, said sleeve having a flange on its outer end with notches registering with said slots, a locking-ring mounted on the sleeve and provided with notches adapted to register with the slots in the sleeves and the notches in the body portion of the female member, a male member adapted to enter said sleeve, lugs carried by said male member adapted to be engaged by the locking-ring, and means for securing the locking-ring in the locked position, substantially as described.

3. In a hose-coupling, a female member comprising a recessed body portion, a sleeve fitted in the said recessed body portion and provided on its outer end with an annular flange, a locking-ring mounted for rotation on the sleeve between the flange and the body portion of the female member, a male member adapted to enter said sleeve and provided with lugs which seat in notches provided therefor in the body portion of the female member, and means for securing the locking-ring in the locked position, substantially as described.

4. In a hose-coupling, a female member comprising a recessed body portion, a slotted sleeve fitted therein, a locking-ring mounted for rotation on the sleeve, a male member adapted to extend into the said sleeve, lugs carried by said male member to engage notches provided therefor in the female member, and means for securing the locking-ring in the locked position, substantially as described.

In testimony whereof I affix my signature in the presence of two witnesses.

CHARLIE E. CHAFFEY.

Witnesses:
H. C. EVERT,
A. M. WILSON.